No. 616,768.　　　　　　　　　　　　　　　　　Patented Dec. 27, 1898.
C. C. CHANCEY.
SEED DROPPER.
(Application filed Jan. 21, 1898.)
(No Model.)
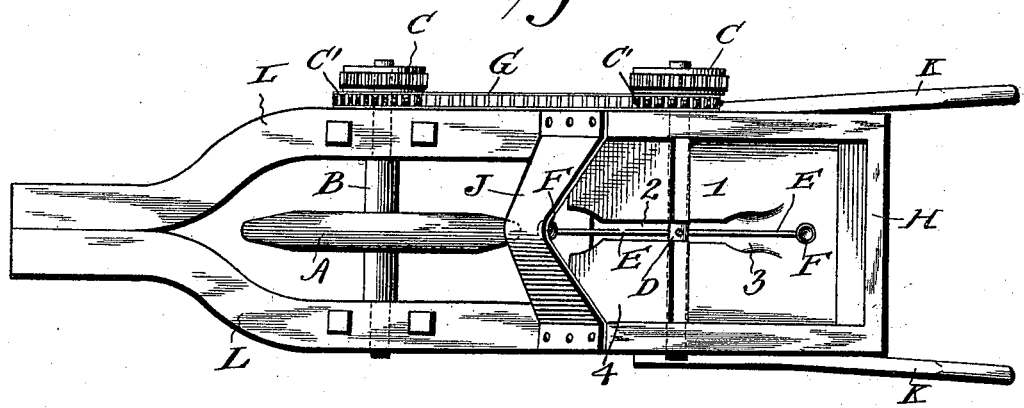
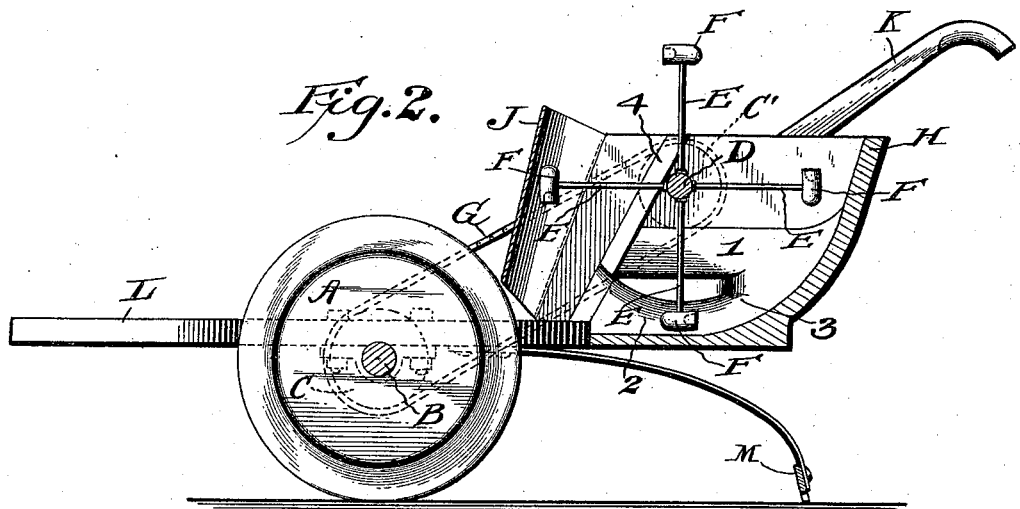

UNITED STATES PATENT OFFICE.

CHRISTOPHER COLUMBUS CHANCEY, OF KINSEY, ALABAMA.

SEED-DROPPER.

SPECIFICATION forming part of Letters Patent No. 616,768, dated December 27, 1898.

Application filed January 21, 1898. Serial No. 667,518. (No model.)

*To all whom it may concern:*

Be it known that I, CHRISTOPHER COLUMBUS CHANCEY, a citizen of the United States, residing at Kinsey, Henry county, Alabama, have invented a new and useful Seed-Dropper, of which the following is a specification.

The invention relates to improvements in seed-droppers.

The object of the present invention is to improve the construction of seed-droppers and to provide a simple and efficient one adapted to be advantageously employed in partially-cleared land where there are numerous stumps and trees that would prevent the use of a two-horse planter.

The invention consists in the construction and novel combination and arrangement of parts, as hereinafter fully described, illustrated in the accompanying drawings, and pointed out in the claim hereto appended.

In the drawings, Figure 1 is a plan view of a seed-droper constructed in accordance with this invention. Fig. 2 is a longitudinal sectional view of the same.

Like letters and numerals of reference designate corresponding parts in the figures of the drawings.

The frame of the seed-dropper consists of a pair of side beams L, provided with suitable bearings for the reception of a shaft or axle B and having parallel rear portions and converged front portions which meet and form a draft-beam, as clearly shown in Fig. 1. The shaft or axle B has fixed to it a main or drive wheel A, adapted to run in the furrow and provided with a tapered periphery, as shown, and it is located at the front portion of the frame in advance of the hopper H, which is mounted upon the rear ends of the beams L.

The hopper H, which has parallel sides, is provided with an oppositely-inclined bottom 1, sloping toward the center of the hopper and provided thereat with a longitudinal groove or recess 2, having undercut side walls to form a passage for cups F and provided with an enlarged and slightly-flared rear portion 3. The rear wall of the hopper is slightly curved at its lower portion, as clearly illustrated in Fig. 2 of the accompanying drawings, and the construction of the lower portion of the hopper is such that the seed is directed toward the center and the enlarged or flared portion of the longitudinal recess will become filled, so that the cups moving through the said recess will receive seed as long as there is any in the hopper.

The seed-cups which drop the seed are mounted on the outer ends of shanks or rods E, extending from a transverse shaft D, which is journaled in suitable bearings at the sides of the hopper. The axle B and the shaft D are extended beyond one side of the frame and carry sprocket-wheels C and C', arranged in pairs and connected by a sprocket-chain G. The two pairs are of different diameters, and the chain is adapted to vary the speed of the seed-dropping mechanism.

The hopper is provided near its front with an inclined partition 4, extending upward and rearward and provided with a central slot enlarged at the bottom to permit the passage of the seed-cups and their shanks or rods. By removing the seed-cups from two of the arms the distance between the seed deposits is increased. The front of the hopper is provided with a forwardly-bowed shield J, constructed of sheet metal and being substantially V-shaped in cross-section. The seed falls between the guard or shield and the inclined partition, and the former prevents the seed from striking the wheel. The seed-dropper is provided at opposite sides with inclined handles K, extending rearward above the hopper. The seed, after being dropped, is covered by a board M, connected with the frame by resilient arms.

The invention has the following advantages: The seed-dropping mechanism is simple and inexpensive in construction and positive and reliable in operation, and the bottom of the hopper is so constructed that the seed is directed toward the center, so that the seed-cups will be supplied as long as there is any seed in the hopper. The guard or shield, which is located in advance of the inclined partition, prevents the seed from striking the wheel.

What is claimed is—

The combination with a frame, and a drive-wheel, of a hopper having inclined side and back portions and provided at its bottom with a longitudinal groove or recess undercut at the side walls and having an enlarged and slightly-flared rear portion, the inclined partition provided with a central slot enlarged at its bottom, said partition being located near the front of the hopper, the forwardly-bowed guard or shield arranged at the front of the hopper and located back of the wheel, a shaft journaled on the hopper and provided with arms or shanks, seed-cups carried by the arms or shanks and arranged to pass through the said recess and slot, and gearing for connecting the shaft and the wheel, substantially as described.

CHRISTOPHER COLUMBUS CHANCEY.

Witnesses:
CHARLES HOWARD BURDESHAW,
RICHARD CLYDE GRICE.